United States Patent
Robichaux et al.

(10) Patent No.: US 6,364,812 B1
(45) Date of Patent: Apr. 2, 2002

(54) AUTOMATIC TRANSMISSION DYNAMIC ELECTRONIC PRESSURE CONTROL BASED ON DESIRED POWERTRAIN OUTPUT

(75) Inventors: Jerry Dean Robichaux, Riverview; Gary Bruce Webster, Livonia, both of MI (US)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/309,817

(22) Filed: May 11, 1999

(51) Int. Cl.[7] ............................................. F16H 61/26
(52) U.S. Cl. ...................................................... 477/160
(58) Field of Search ................................ 477/159, 160, 477/161

(56) References Cited

U.S. PATENT DOCUMENTS

| | | | |
|---|---|---|---|
| 5,445,125 A | | 8/1995 | Allen |
| 5,445,579 A | * | 8/1995 | Fijita et al. ................... 477/156 |
| 5,458,545 A | * | 10/1995 | Adam et al. ................... 475/120 |
| 5,475,595 A | * | 12/1995 | Asahara et al. ............... 477/109 |
| 5,571,060 A | * | 11/1996 | Becker et al. ................. 477/159 |
| 5,573,476 A | * | 11/1996 | Minowa et al. ............... 477/109 |
| 5,647,820 A | * | 7/1997 | Matsumoto et al. .......... 477/158 |
| 5,782,711 A | * | 7/1998 | Tsutsui et al. ................. 477/156 |
| 5,848,951 A | * | 12/1998 | Lee ................................ 477/133 |
| 5,873,803 A | * | 2/1999 | Geon ............................. 477/158 |
| 6,190,286 B1 | * | 2/2001 | Ito et al. ........................ 477/160 |

FOREIGN PATENT DOCUMENTS

GB           2 312 970 A        11/1997

* cited by examiner

*Primary Examiner*—Dirk Wright
(74) *Attorney, Agent, or Firm*—Frank G. McKenzie

(57) ABSTRACT

A system and method for controlling a powertrain including an automatic transmission include determining a value representing requested powertrain output, determining a rotational speed representing current operating conditions, generating a command to initiate a ratio change in the automatic transmission, and determining a dynamic pressure for the automatic transmission during the ratio change based on the requested powertrain output and the rotational speed. The requested powertrain output may be a wheel torque determined in part by accelerator pedal position. A performance adder based on requested wheel torque may be provided to further enhance operation.

22 Claims, 3 Drawing Sheets

AUTOMATIC TRANSMISSION DYNAMIC ELECTRONIC PRESSURE CONTROL BASED ON DESIRED POWERTRAIN OUTPUT

TECHNICAL FIELD

The present invention is directed to a system and method for controlling an automatic transmission including controlling transmission hydraulic pressure during ratio changes.

BACKGROUND ART

Mechanical throttle control systems use airflow as the primary control parameter in controlling engine or powertrain output. The airflow is controlled by a throttle valve in the intake which is mechanically linked to a throttle pedal. As such, many powertrain control parameters, including automatic transmission hydraulic pressure control, were traditionally based on, or indexed by, the throttle valve position.

Electronic airflow control systems, such as variable cam timing systems and electronic throttle control systems, replace the traditional mechanical throttle cable system with an "electronic linkage" provided by sensors and actuators in communication with an electronic controller. This increases the control authority of the electronic controller and allows the airflow to be controlled independently of the accelerator pedal position. As such, the throttle valve position is no longer necessarily indicative of the requested or desired powertrain output.

SUMMARY OF THE INVENTION

It is an object of the present invention to provide a system and method for controlling hydraulic pressure within an automatic transmission during a ratio change based on a desired powertrain output, such as engine torque, wheel torque, wheel power, or tractive effort.

In carrying out the above object and other objects, advantages, and features of the present invention, a system and method for controlling a vehicular powertrain including an automatic transmission having a plurality of selectable input to output ratios, include determining a value representing requested powertrain output, determining a rotational speed representing current operating conditions, generating a command to initiate a ratio change in the automatic transmission, determining a dynamic pressure for the automatic transmission during the ratio change based on the requested powertrain output and the rotational speed, and using the dynamic pressure to control the actuation pressure of the automatic transmission. In one embodiment, a performance adder is determined based on the requested powertrain output and added to the dynamic pressure. Powertrain output may be represented by various parameters including engine torque, wheel torque, wheel power, and tractive effort, for example. Likewise, depending upon the particular application, the rotational speed may represent vehicle speed, output shaft speed, wheel speed, or the like.

The present invention provides a number of advantages over prior art control strategies. For example, the present invention provides a modular control structure where hydraulic pressure control during ratio changes is based on powertrain output, such as requested wheel torque, rather than throttle position. As such, the control strategy of the present invention may be easily adapted to new engine technologies such as lean burn, variable cam timing, and direct injection. Dynamic hydraulic pressure control which is independent of throttle valve position allows increased authority of control of the throttle valve such that it can be nearly wide open without affecting various other vehicle operating parameters, including transmission hydraulic pressure control.

In a preferred embodiment, dynamic electronic pressure control based on wheel torque and vehicle speed provides better compensation at higher altitudes (lower barometric pressure) while facilitating calibration of the pressure control in the same domain as the shift schedules.

The above advantages and other advantages, objects, and features of the present invention, will be readily apparent from the following detailed description of the best mode for carrying out the invention when taken in connection with the accompanying drawings.

BEST MODE(S) FOR CARRYING OUT THE INVENTION

Figure 1:
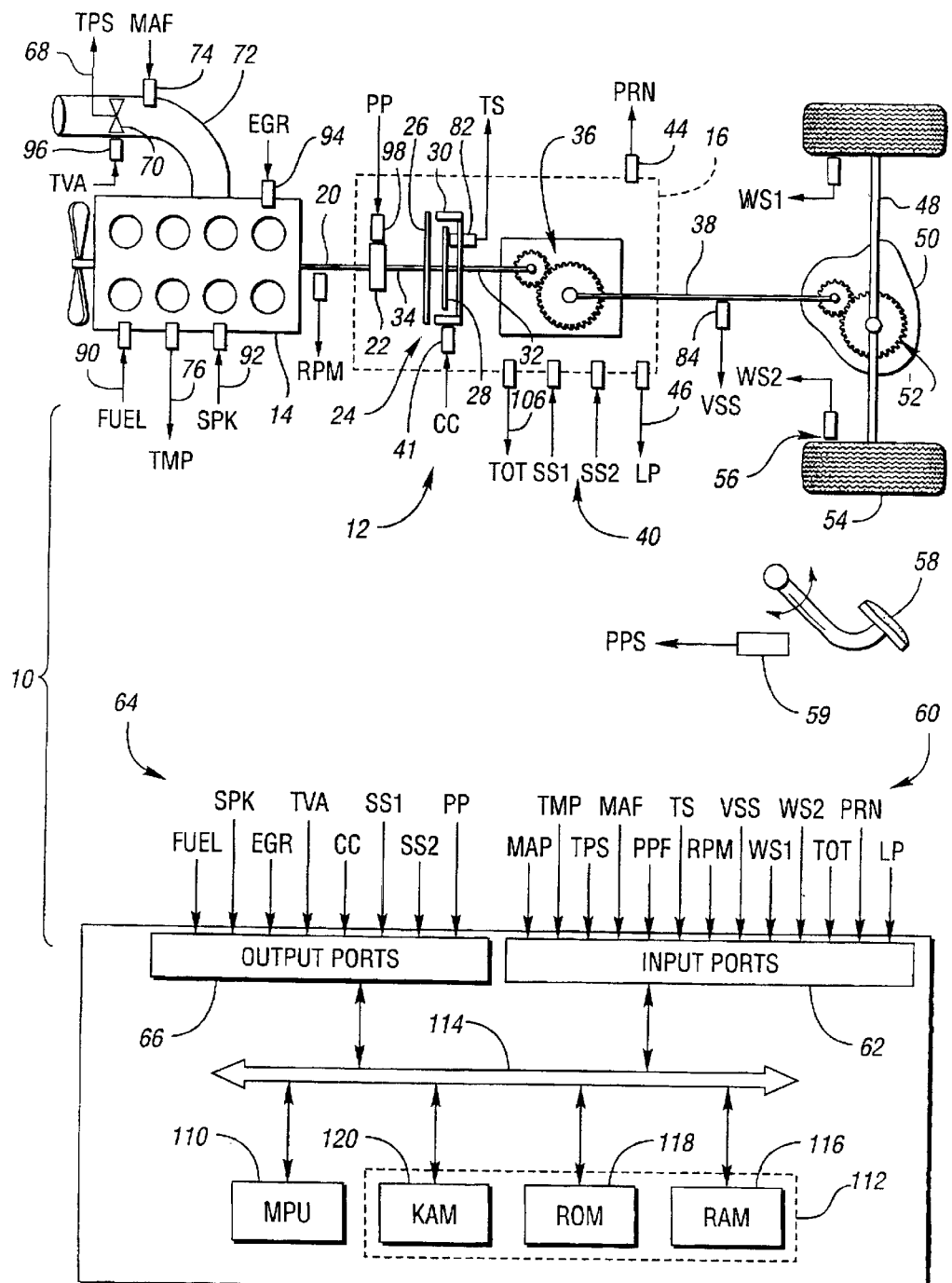
FIG. 1 is a block diagram illustrating a system and method for output torque based dynamic electronic pressure control during shifting according to the present invention.

FIG. 1 provides a block diagram illustrating operation of a system or method for output torque based hydraulic pressure control for an automatic transmission during shifting according to the present invention.

System 10 includes a vehicular powertrain 12 having an internal combustion engine 14 coupled to an automatic transmission 16. Powertrain 12 may also include a controller 18 in communication with engine 14 and transmission 16 for providing various information and control functions. Engine 14 is connected to transmission 16 via crankshaft 20 which is connected to transmission pump 22 and/or torque converter 24. Preferably, torque converter 24 is a hydrodynamic torque converter including a pump or impeller 26 which is selectively fluidly coupled to a turbine 28. Torque converter 24 may also include a frictional converter clutch or bypass clutch 30 which provides a selective frictional coupling between turbine shaft 32 and input shaft 34.

Automatic transmission 16 includes a plurality of input-to-output ratios or gear ratios effected by various gears, indicated generally by reference numeral 36, and associated frictional elements such as clutches, bands, and the like, as well known in the art. Gears 36 provide selective reduction or multiplication ratios between turbine shaft 32 and output shaft 38. Automatic transmission 16 is preferably electronically controlled via one or more shift solenoids, indicated generally by reference numeral 40, and a converter clutch control (CC) 41 to select an appropriate gear ratio based on current operating conditions. Transmission 16 also preferably includes an actuator for controlling pump pressure (PP) 42 (or line pressure), in addition to a shift lever position sensor (PRN) 44 to provide an indication of the operator's selected gear or driving mode, such as drive, reverse, park, etc. A line pressure sensor (LP) 46 can be provided to facilitate closed loop feedback control of the hydraulic line pressure during shifting or ratio changing.

Depending upon the particular application, output shaft 38 may be coupled to one or more axles 48 via a final drive reduction or differential 50 which may include one or more gears, as indicated generally by reference numeral 52. Each axle 48 may include two or more wheels 54 having corresponding wheel speed sensors 56.

In addition to the sensors described above, powertrain 12 preferably includes a plurality of sensors, indicated generally by reference numeral 60, in communication with corresponding input ports 62 of controller 18 to sense or monitor the current operating and ambient conditions of powertrain 12. A plurality of actuators, indicated generally by reference numeral 64, communicate with controller 18 via output ports 56 to effect control of powertrain 12 in response to commands generated by controller 18.

The sensors preferably include a throttle valve position sensor (TPS) 68 which monitors the position of throttle valve 70 which is disposed within intake 72. A mass airflow sensor (MAF) 74 provides an indication of the air mass flowing through intake 72. A temperature sensor (TMP) 76 provides an indication of the engine coolant temperature, or alternatively engine oil temperature.

As also illustrated in FIG. 1, an engine speed sensor (RPM) 80 monitors rotational speed of crankshaft 20. Similarly, a turbine speed sensor 82 monitors the rotational speed of the turbine 28 of torque converter 24. Another rotational speed sensor, vehicle speed sensor (VSS) 84, provides an indication of the speed of output shaft 38 which may be used to determine the vehicle speed based on the ratio of differential 50 and the size of wheels 54. Of course, wheel speed sensors (WS1 and WS2) 56 may be used to provide an indication of the vehicle speed as well.

Depending upon the particular application requirements, various sensors may be omitted or alternative sensors provided which generate signals indicative of related sensed parameters. Values corresponding to ambient or operating conditions may be inferred or calculated using one or more of the sensed parameters without departing from the spirit or scope of the present invention.

An accelerator pedal 58 is manipulated by the driver to control the output of powertrain 12. A pedal position sensor 59 provides an indication of the position of accelerator pedal 58, preferably in the form of counts, with an increasing number of counts indicating a request for increased power output. A manifold absolute pressure (MAP) sensor, or equivalent, may be used to provide an indication of the current barometric pressure and manifold pressure.

Actuators 64 are used to provide control signals or to effect movement of various devices in powertrain 12. Actuators 64 may include actuators for timing and metering fuel (FUEL) 90, controlling ignition angle or timing (SPK) 92, setting the amount of exhaust gas recirculation (EGR) 94, and adjusting the intake air using throttle valve 70 with an appropriate servomotor or actuator (TVA) 96. As described above, automatic transmission 16 may be selectively controlled by controlling transmission pump or line pressure using an appropriate actuator (PP) 42 in combination with shift solenoids (SS1 and SS2) 40 which are used to select an appropriate gear ratio, and a converter clutch actuator or solenoid (CC) 41 used to lock, unlock, or control slip of the torque converter clutch 30. Also preferably, a temperature sensor 106 is provided to determine the transmission oil temperature (TOT).

Controller 18 is preferably a microprocessor-based controller which provides integrated control of engine 14 and transmission 16 of powertrain 12. Of course, the present invention may be implemented in a separate engine or transmission controller depending upon the particular application. Controller 18 includes a microprocessor 110 in communication with input ports 62, output ports 66, and computer readable media 112 via a data/control bus 114. Computer readable media 112 may include various types of volatile and nonvolatile memory such as random access memory (RAM) 116, read-only memory (ROM) 118, and keep-alive memory (KAM) 120. These "functional" descriptions of the various types of volatile and nonvolatile storage may be implemented by any of a number of known physical devices including but not limited to EPROMs, EEPROMs, PROMS, flash memory, and the like. Computer readable media 112 include stored data representing instructions executable by microprocessor 110 to implement the method for controlling hydraulic pressure during shifting according to the present invention.

Figure 2:
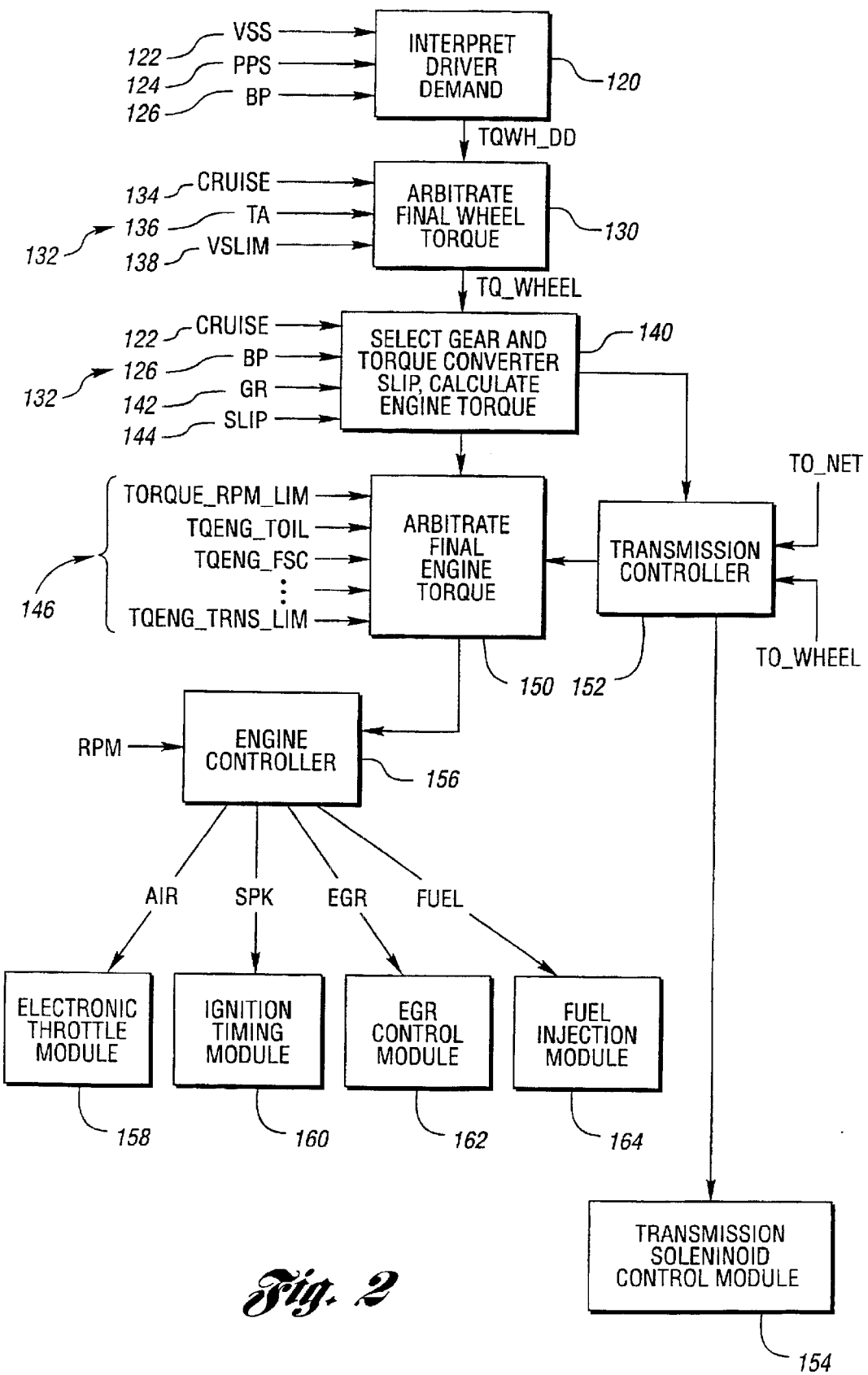
FIG. 2 is a block diagram illustrating an output torque based powertrain control strategy including automatic transmission shift scheduling according to the present invention.

FIG. 2 provides a block diagram for a modular control architecture including wheel torque based transmission ratio selection according to the present invention. A driver demand is interpreted as represented by block 120 based on the vehicle speed 122 accelerator pedal position 124 and barometric pressure 126. The driver demand wheel torque (TQWH DD) is provided as an input to block 130 which arbitrates the final wheel torque among various other torque requesters, indicated generally by reference numeral 132. Such torque requesters may include, for example, a cruise control torque 134, a traction assist torque 136, and/or a vehicle speed limiting torque 138. Block 130 selects the appropriate torque depending upon the current operating conditions and provides this final wheel torque (TQ_WHEEL) to block 140 which performs a number of functions including scheduling the gear ratio and determining torque converter slip according to the present invention. Block 140 may also include calculation of an engine torque based on the final wheel torque (TQ_WHEEL). Inputs used in these determinations include vehicle speed 122, barometric pressure 126, current gear ratio 142, and current torque converter slip 144 or torque converter speed ratio. Selection or scheduling of the appropriate gear ratio is explained in greater detail below.

The engine torque requested from block 140 is arbitrated with various other engine torque limiting functions 146 as represented by block 150. Transmission controller 152 may also request torque limiting or modulation to provide cancellation of the inertia phase to improve shift feel. Transmission controller 152 communicates with transmission solenoid control module 154 which energizes the appropriate shift solenoids and/or converter clutch solenoid to effect the ratio change. Solenoid control module 154 also dynamically controls the line pressure via transmission pump pressure actuator 42 during a ratio change to improve shift feel as described in greater detail with reference to FIG. 3. Alternatively, the apply and release pressures for individual clutches or shifting elements may be controlled during the ratio change to further improve shift feel.

The final engine torque determined by block 150 is communicated as a desired engine torque to engine controller 156. The engine controller determines the appropriate airflow, spark, EGR, and fuel as represented by blocks 158, 160, 162, and 164, respectively, to achieve the desired engine torque.

While the present invention is described with reference to a desired wheel torque, one of ordinary skill in the art will recognize that the present invention could be easily applied to a system which uses a desired tractive effort, wheel power, or desired transmission output shaft torque while providing similar benefits in fuel economy, modularity, and drivability.

Figure 3:
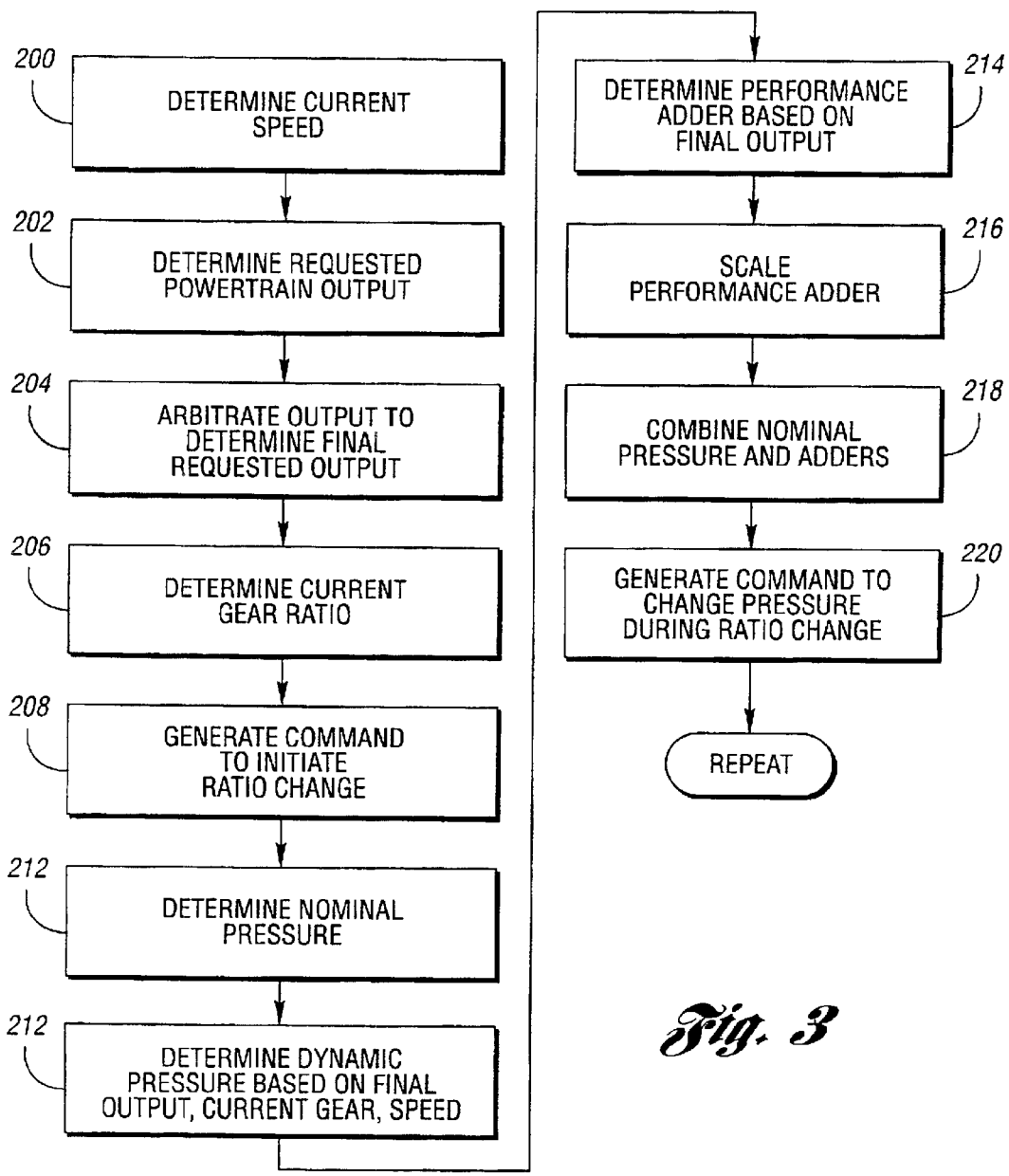
FIG. 3 is a flowchart illustrating control logic for implementing a system or method for dynamic electronic pressure control according to the present invention.

Referring now to FIG. 3, a flowchart illustrating control logic of one embodiment of a system or method according to the present invention is shown. As will be appreciated by one of ordinary skill in the art, the flowchart illustrated in FIG. 3 may represent any of a number of known processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages of the invention, but is provide for ease of illustration and description. In particular, those functions illustrated in dashed lines are optional depending upon the particular application or operating conditions. Preferably, the control logic is implemented in software which is executed by a microprocessor-based controller. Of course, the control logic may be implemented in software, hardware, or a combination of software and hardware.

A rotational speed representing current operating conditions is determined as represented by block 200. In a preferred embodiment, block 200 represents determination of the vehicle speed. Of course, various other rotational speeds may be used to represent the current operating conditions, such as the output shaft rotational speed, wheel speed, engine speed, or the like. Likewise, block 200 may represent determination of the current turbine speed which may be used in conjunction with the output shaft speed to determine the current gear ratio (represented in block 206). The requested powertrain output is then determined as represented by block 202. Preferably, the requested powertrain output is determined based at least in part on the position of an accelerator pedal. In a preferred embodiment, block 202 represents determination of a requested wheel torque based on accelerator pedal position, barometric pressure, and vehicle speed. Other powertrain output parameters which may be utilized to determine the requested powertrain output include engine torque, wheel power, and tractive effort.

The requested powertrain output is arbitrated with various other output requesters as represented by block 204. Additional requesters may include cruise control, vehicle speed limiting, traction control, and the like. Block 204 selects or determines a final requested output based on the output requesters and current operating conditions. In a preferred embodiment, block 204 determines a final requested wheel torque.

The current gear ratio is determined as represented by block 206. The gear ratio determination may be made by selection of one of a plurality of stored gear ratios based on a sensor input corresponding to engagement of a particular gear in a discrete step transmission. Alternatively, a current gear ratio may be determined based on the transmission input speed and output speed as determined by block 200. A command is then generated to initiate a ratio change as represented by block 208. This may include determination of the appropriate upshift or downshift from the current gear ratio to the next gear ratio based on the final requested output and the current vehicle speed, for example. This information is then used to determine a nominal actuation or shifting pressure as represented by block 210. Preferably, this pressure is stored in a lookup table which is accessed or indexed by the requested powertrain output, i.e., engine output torque in a preferred embodiment. Depending upon the particular application, block 210 may determine a nominal pressure for the line pressure by regulating output of the transmission pump, or may determine an apply and/or release pressure for one or more shifting elements within the transmission.

A dynamic pressure is then determined based on the final requested output, the current gear, and the current speed. The current gear may alternatively represent a current ratio change, i.e., 1–2, 3–4, 3–2, etc. The dynamic pressure is preferably stored in a lookup table which is selected based on the particular ratio change, and indexed or accessed by the value of the final requested output (i.e., wheel torque in one embodiment) and the current speed.

A performance adder is determined based on the value of the final output as represented by block 214. An optional scaling factor may be applied to the value determined by block 214, as represented by block 216. The nominal pressure is then combined with the dynamic pressure and/or the performance adder as represented by block 218 to determine the final dynamic pressure. A command is then generated to change the hydraulic pressure within the transmission to achieve the final dynamic pressure during the ratio change. Depending upon the particular values for the nominal pressure, dynamic pressure, and performance adder, the effect of block 220 may be to increase or decrease the nominal hydraulic pressure to provide an acceptable shift feel.

While the best mode for carrying out the invention has been described in detail, those familiar with the art to which this invention relates will recognize various alternative designs and embodiments for practicing the invention as defined by the following claims.

What is claimed is:

1. A method for controlling a powertrain including an automatic transmission, the method comprising:
    determining a value representing requested powertrain output;
    determining a rotational speed representing current operating conditions;
    generating a command to initiate a ratio change in the automatic transmission;
    determining a dynamic pressure for the automatic transmission during the ratio change based on the requested powertrain output and the rotational speed; and
    using the dynamic pressure to control the actuation pressure of the automatic transmission.

2. The method of claim 1 wherein the step of determining a dynamic pressure comprises determining a line pressure by modulating pressure generated by a transmission oil pump.

3. The method of claim 1 wherein the step of determining a dynamic pressure comprises determining an apply pressure for at least one ratio changing element within the automatic transmission.

4. The method of claim 1 further comprising:
    determining a performance adder based on the rotational speed; and
    combining the performance adder with the dynamic pressure before using the dynamic pressure to control the actuation pressure of the automatic transmission.

5. The method of claim 1 wherein the step of determining a rotational speed comprises determining a vehicle speed.

6. The method of claim 1 wherein the step of determining a rotational speed comprises determining an engine speed.

7. The method of claim 1 wherein the step of determining a value representing requested powertrain output comprises determining a requested wheel torque based at least in part on position of an accelerator pedal.

8. The method of claim 1 wherein the step of determining a value representing requested powertrain output comprises determining a requested output shaft torque based at least in part on position of an accelerator pedal.

9. The method of claim 1 wherein the step of determining a value representing requested powertrain output comprises determining a requested wheel power.

10. The method of claim 1 wherein the step of determining a value representing requested powertrain output comprises determining a requested output power.

11. The method of claim 1 wherein the step of determining a value representing requested powertrain output comprises determining a requested tractive effort.

12. A method for controlling a vehicular powertrain including an internal combustion engine coupled to an automatic transmission having a plurality of selectable gear ratios between an input shaft and an output shaft, the powertrain also including an electronic controller in communication with the engine and the automatic transmission for controlling hydraulic pressure within the automatic transmission during a gear ratio change, the method comprising:
   determining a current vehicle speed;
   determining a requested wheel torque based at least in part on position of an accelerator pedal and the current vehicle speed;
   arbitrating the requested wheel torque with at least one other requested torque to determine a final requested wheel torque;
   determining a current gear ratio;
   generating a command to initiate a ratio change from the current gear ratio to a next gear ratio;
   determining a nominal actuation pressure for the automatic transmission based on the final requested wheel torque;
   determining a dynamic pressure adder for the automatic transmission based on the final requested wheel torque, the current gear ratio, and the current vehicle speed;
   combining the dynamic pressure adder and the nominal actuation pressure to generate a final dynamic pressure; and
   generating a command to change hydraulic pressure within the automatic transmission during the ratio change based on the final dynamic pressure.

13. The method of claim 12 further comprising:
   determining a performance pressure adder based on the final requested wheel torque; and
   wherein the step of combining the dynamic pressure and the nominal actuation pressure further includes combining the performance pressure adder to generate the final dynamic pressure.

14. The method of claim 13 further comprising:
   determining a performance weighting factor; and
   wherein the step of combining the dynamic pressure and the nominal actuation pressure includes scaling the performance pressure adder using the performance weighting factor before combining the performance pressure adder to generate the final dynamic pressure.

15. A method for controlling a vehicular powertrain including an internal combustion engine coupled to an automatic transmission having a plurality of selectable gear ratios between an input shaft and an output shaft, the powertrain also including an electronic controller in communication with the engine and the automatic transmission for controlling hydraulic pressure within the automatic transmission during a gear ratio change, the method comprising:
   determining a current output shaft speed;
   determining a requested output torque based at least in part on position of an accelerator pedal and the current output shaft speed;
   arbitrating the requested output torque with at least one other requested torque to determine a final requested output torque;
   determining a current gear ratio;
   generating a command to initiate a ratio change from the current gear ratio to a next gear ratio;
   determining a nominal actuation pressure for the automatic transmission based on the final requested output torque;
   determining a dynamic pressure adder for the automatic transmission based on the final requested output torque, the current gear ratio, and the current output shaft speed;
   combining the dynamic pressure adder and the nominal actuation pressure to generate a final dynamic pressure; and
   generating a command to change hydraulic pressure within the automatic transmission during the ratio change based on the final dynamic pressure.

16. A computer readable storage medium having stored therein data representing instructions executable by a computer to control a powertrain including an automatic transmission, the computer readable storage medium comprising data representing:
   instructions for determining a value representing requested powertrain output;
   instructions for determining a rotational speed representing current operating conditions;
   instructions for generating a command to initiate a ratio change in the automatic transmission;
   instructions for determining a dynamic pressure for the automatic transmission during the ratio change based on the requested powertrain output and the rotational speed; and
   instructions for using the dynamic pressure to control the actuation pressure of the automatic transmission.

17. The computer readable storage medium of claim 16 wherein the instructions for determining a dynamic pressure comprise instructions for determining a line pressure by modulating pressure generated by a transmission oil pump.

18. The computer readable storage medium of claim 16 wherein the instructions for determining a dynamic pressure comprise instructions for determining an apply pressure for at least one ratio changing element within the automatic transmission.

19. The computer readable storage medium of claim 16 further comprising:
   instructions for determining a performance adder based on the rotational speed; and
   instructions for combining the performance adder with the dynamic pressure before using the dynamic pressure to control the actuation pressure of the automatic transmission.

20. A method for controlling a powertrain including an automatic transmission, the method comprising:
   determining a value representing requested powertrain output;
   determining a rotational speed representing current operating conditions;
   generating a command to initiate a ratio change in the automatic transmission;
   determining a dynamic pressure for the automatic transmission during the ratio change based on the requested powertrain output and the rotational speed independently of throttle valve position; and using the dynamic pressure to control the actuation pressure of the automatic transmission.

21. A method for controlling a powertrain including an automatic transmission, the method comprising:

determining a value representing requested powertrain output;

determining a rotational speed representing current operating conditions;

generating a command to initiate a ratio change in the automatic transmission;

determining a dynamic apply pressure for at least one ratio changing element within the automatic transmission during the ratio change based on the requested powertrain output and the rotational speed independently of throttle valve position; and using the dynamic pressure to control the apply pressure for the at least one ratio changing element of the automatic transmission.

22. A method for controlling a powertrain including an automatic transmission, the method comprising:

determining a value representing requested wheel torque;

determining a rotational speed representing current operating conditions;

generating a command to initiate a ratio change in the automatic transmission;

determining a nominal pressure for the automatic transmission during the ratio change;

determining a dynamic pressure for the automatic transmission during the ratio change based on the requested powertrain output and the rotational speed independently of throttle valve position;

determining a performance adder based on the rotational speed;

controlling the automatic transmission to provide a hydraulic pressure based on combining the nominal pressure, the dynamic pressure, and the performance adder.

* * * * *